APPARATUS FOR CONTROLLING VAPOUR DEPOSITION IN A VACUUM

Filed Oct. 14, 1964 2 Sheets-Sheet 1

WALTER STECKELMACHER,
JAMES ENGLISH,
HUGH H. A. BATH,

INVENTORS

BY Hall & Houghton

ATTORNEY

May 14, 1968 W. STECKELMACHER ET AL 3,382,842

APPARATUS FOR CONTROLLING VAPOUR DEPOSITION IN A VACUUM

Filed Oct. 14, 1964 2 Sheets-Sheet 2

WALTER STECKELMACHER,
JAMES ENGLISH,
HUGH H. A. BATH,
INVENTORS

BY Hall & Houghton

ATTORNEY

United States Patent Office 3,382,842
Patented May 14, 1968

3,382,842

APPARATUS FOR CONTROLLING VAPOUR DEPOSITION IN A VACUUM

Walter Steckelmacher, Ifield, Crawley, James English, Pound Hill, Crawley, and Hugh H. A. Bath, Reigate, England, assignors to Edwards High Vacuum International Limited, Crawley, England Filed Oct. 14, 1964, Ser. No. 403,772
Claims priority, application Great Britain, Oct. 16, 1963, 40,882/63
8 Claims. (Cl. 118—8)

ABSTRACT OF THE DISCLOSURE

Apparatus for controlling vapour deposition in a vacuum of the type in which deposition occurs on a monitor crystal forming part of the oscillator circuit of a monitor oscillator and in which the frequency of oscillation of said monitor crystal is compared with a fixed frequency oscillator. A difference signal thus derived is compared with a variable frequency oscillator to give a further difference signal which may be brought to zero prior to each deposition run. Said further difference signal is utilised to terminate a deposition run after a predetermined thickness has been deposited and also to control the rate of deposition during said run.

Figure 1:
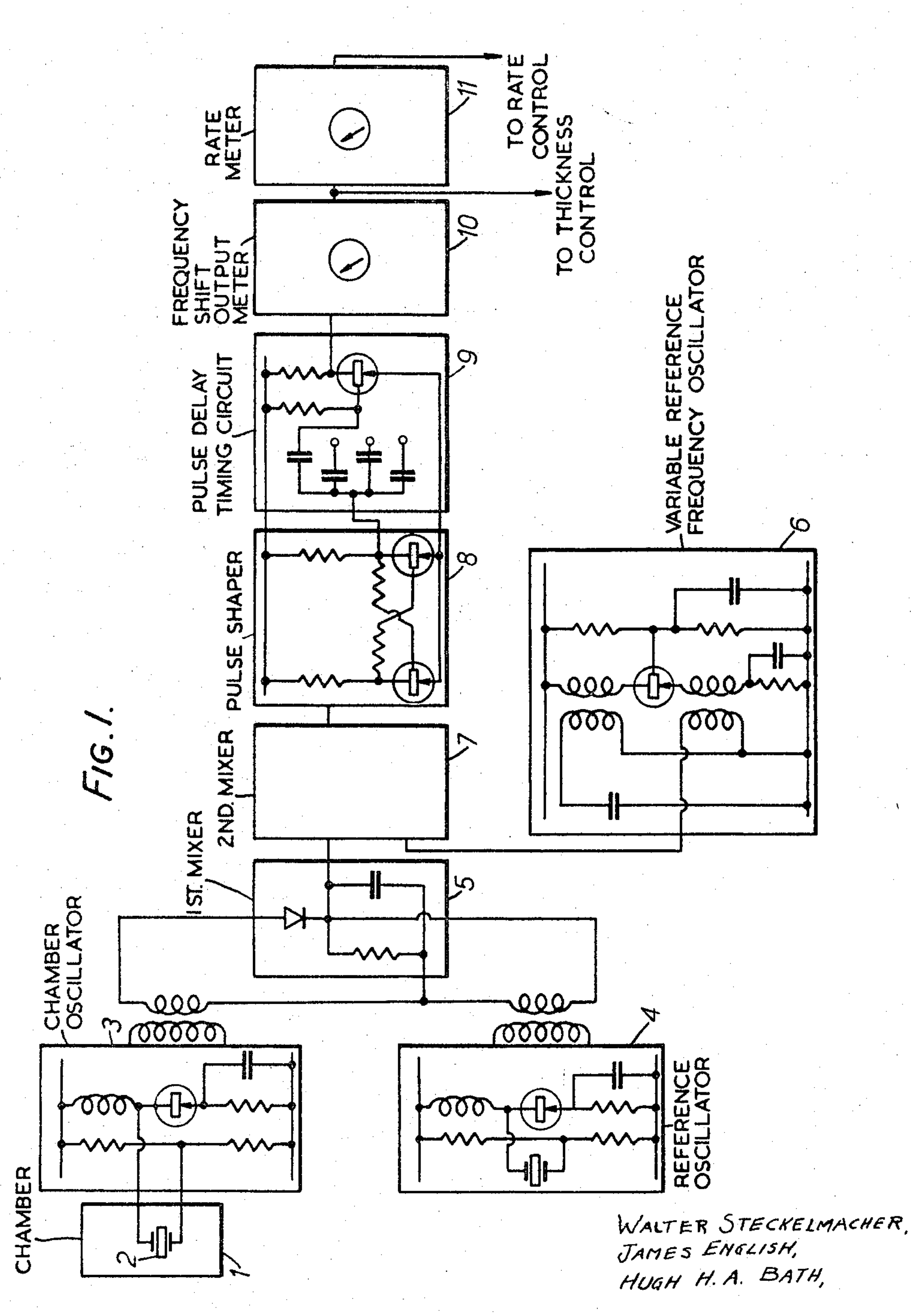

This invention relates to vacuum evaporation plant and in particular to a method of, and apparatus for, measuring and controlling the rate of formation, and thickness of, vapour deposited films.

The use of vapour deposition apparatus finds wide applications in building up miniaturized electrical circuits and similar delicate film forming operations. Due to the very close tolerances required when building up films in these sorts of applications very fine control is needed. A useful method of monitoring the mass of material that has been deposited on a substrate is afforded by the charge in the natural resonance frequency of a quartz crystal which occurs when the crystal becomes mass loaded, i.e., has a film of vapour deposited on it. This effect has been used for many years to make small adjustments to the resonance frequency of quartz crystals and latterly has been used to monitor film thicknesses in evaporation plant as well. The main problem that arises from the use of a quartz crystal in this way is the measurement, under operating conditions, of the relatively small changes in frequency that occur. It is a known technique to compare the frequency of an oscillator controlled by such a monitoring crystal with the frequency of a second oscillator and to derive a difference signal, or beat frequency, that affords an accurate measure of the small changes that occur in the frequency of the monitoring crystal during deposition. The choice of the second oscillator presents problems of its own. If a fixed frequency quartz crystal oscillator is used then, after a few operating runs, the monitoring frequency will have changed due to the build up of deposited films, and at the beginning of the next run will be too widely divergent from the reference oscillator to produce a satisfactory comparison signal. The apparatus must then be dismounted and the monitoring crystal cleaned off and the apparatus reassembled. This is time consuming and makes continuous operation of the plant limited to only a few runs.

If a conventional L–C oscillator, whose frequency may be varied, is used as the reference oscillator it is found that although an advantage is gained from being able to shift the 'zero' of the reference oscillator before each run if necessary a disadvantage is encountered because the L–C oscillator is not stable enough to produce a constant signal of sufficient accuracy.

Other attempts have been made to provide an accurate but variable frequency reference oscillator, either by using synthesizers which are costly and complex, or else by using a step-variable quartz crystal oscillator. Such an oscillator being provided with a number of quartz crystals of differing natural resonance frequency that may be switched in sequentially to provide a stepwise range of reference frequencies.

The object of the present invention is to provide a practical method of, and apparatus for, measuring and controlling the rate of formation and thickness of a deposited film which overcomes the problem of 'zeroing' a referenec oscillator referred to above.

For many applications of vapour deposition it is important that a deposited film should grow at a uniform rate and thus a further object of the invention is to provide a control system to control the rate of deposition automatically.

According to the present invention, vacuum coating monitoring apparatus includes a first oscillator controllable by a quartz crystal disposed within a vacuum coating chamber, a second fixed frequency oscillator, a first mixer for deriving a first intermediate frequency signal from the first and second oscillators, a continuously variable frequency oscillator and a second mixer for deriving from the continuously variable oscillator and the output of the first mixer a second intermediate frequency signal whose frequency may be reduced to zero.

The apparatus may further include means for producing, and displaying on a meter, a D.C. control signal whose amplitude is proportional to the frequency of the second intermediate frequency signal and a rate control circuit for producing, and displaying on a rate meter, a D.C. rate control signal whose amplitude is proportional to the rate of change of the control signal.

Preferably, the second fixed frequency oscillator is a quartz crystal controlled oscillator having a fixed frequency greater than the initial frequency of the first oscillator, the first mixer is a conventional diode mixer which may include a selectively tuned amplifier, the variable frequency oscillator is a conventional emitter coupled inductance-capacitor tuned oscillator with a low output impedance, the second mixer is a conventional diode mixer which may include a low pass filter amplifier, the means for producing the control signal comprise a square wave converter and a pulse delay timing circuit and the rate control circuit is a differentiating circuit including a high gain resistance feedback D.C. amplifier supplied via a capacitor in its input.

In the method of controlling a vacuum coating apparatus the control signal may be applied to a potentiometer voltage sensor together with a sensitive switch type null detector to actuate an electromagnetically operated shutter to terminate deposition when a preselected thickness of material has been deposited.

In a method of controlling the rate at which deposition of material takes place the rate control signal may be compared with a reference signal to produce an error signal which, in conjunction with a phase shift circuit actuates in a predetermined manner one or more silicon-controlled rectifiers which regulate a power supply to a heater which supplies heat to the material which is to be deposited.

Advantageously, the power supply may be regulated so that the rate of deposition is constant.

Figure 2:
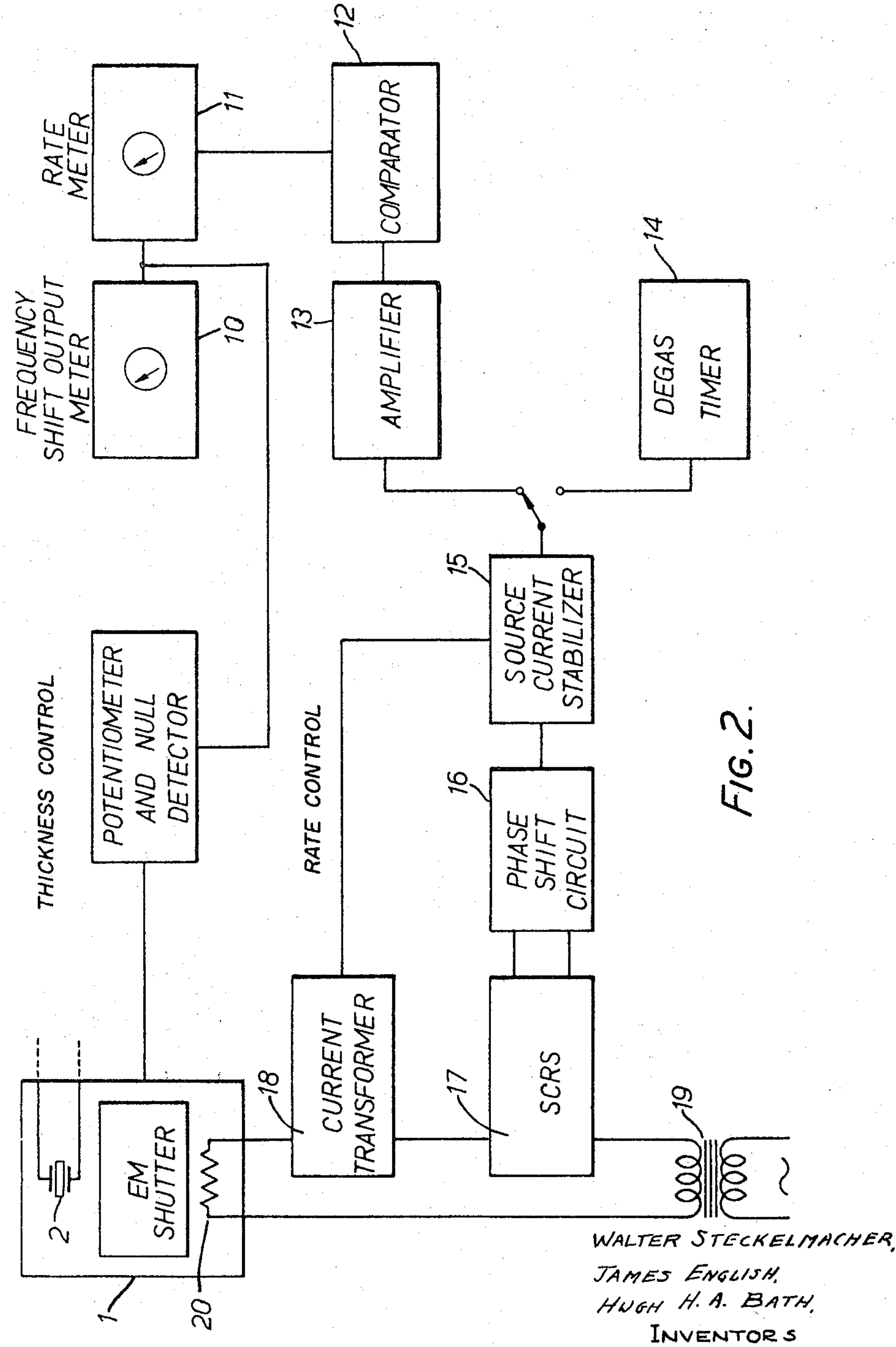

The invention will now be described in greater detail with reference to the accompanying drawings in which:

FIGURE 1 is a block schematic of part of one embodiment the apparatus in which some of the electrical circuits are shown in part only; and FIGURE 2 is a block schematic of one embodiment of the apparatus for controlling the rate of deposition.

Referring to FIGURE 1, a coating chamber 1 in which coating operations take place houses a quartz crystal monitor 2, together with means for supporting, positioning and masking a substrate, means for supporting and heating a supply of evaporant, and a shutter for interrupting the flow of evaporant to the unmasked portions of the substrate. (These latter items are not shown in the drawings.) The monitor crystal 2 controls a chamber oscillator 3, which, in conjunction with a reference oscillator 4, a first mixer 5, a variable reference oscillator 6, a second mixer 7, a pulse shaper 8, and a pulse timing circuit 9, enables a direct measurement of both the film thickness and its rate of formation to be displayed on the meters 10 and 11 respectively. Control signals derived from the frequency meter 10 and the rate meter 11 are applied to control the coating operation in a manner more fully described hereinafter.

The quartz crystal monitor 2 is an AT-cut crystal vibrating in thickness shear with an angle of cut ideally 35° 10′, a crystal of this sort being relatively unaffected by temperature fluctuations. It is coupled in a conventional manner to the chamber oscillator to product stable oscillations at a normal operating frequency of 6 mc./s. The reference oscillator 4 is similarly a conventional quartz crystal controlled oscillator with a fixed frequency output of 6.5 mc./s. The output signals from these two oscillators are fed to a conventional diode mixing circuit 5 which also incorporates a selectively tuned amplifier (to filter off harmonics) and which passes frequencies in the range 500 kc./s.–1 mc./s.

The variable reference frequency oscillator is a conventional emitter coupled inductance-capacitor tuned oscillator with a low output impedance producing an output variable over a range of frequencies between 500 kc./s.–1 mc./s. The low output impedance removes the necessity for a buffer circuit which would otherwise be necessary to prevent the output from the first mixer 5 from "driving" the oscillator 6. The outputs from the first mixer 5 and the oscillator 6 are fed to a second mixer 7 which is a conventional diode mixer together with a low pass filter amplifier. The output from the mixer 7 is thus a substantially sinusoidal signal having a frequency in the range 0–50 kc./s.

The output from the mixer 7 is fed next into the pulse shaper 8 where its approximately sinusoidal waveform is converted to a square waveform without changing its frequency from the range 0–50 kc./s.

The output from the pulse shaper 8 is then fed to the pulse delay timing circuit 9 and eventually produces a D.C. output signal whose amplitude is proportional to the frequency of the input square wave signal. This is achieved in the following manner. A positive swing at the start of a square wave trace triggers the timing circiut 9 to conduct for a fixed time interval and then to become nonconducting again. For example, a 500 c./s. signal will trigger the timing circuit 9 to conduct for 0.4 ms. out of the 2 ms. for which each cycle lasts. Since, with a fixed conducting period of 0.4 ms., the timing circuit would not operate correctly if a signal of frequency greater than 2.5 kc./s. were fed in, the timing circuit 9 is constructed to be manually switchable between four ranges each having a different time constant and can thus accommodate all frequencies in the range 0–50 kc./s. The average signal derived from the timing circuit 9 is passed directly to the frequency shift output meter 10. When switching from one range to the next on the timing circuit 9 adjustment of the variable frequency oscillator 6 may be necessary to 'zero' each range for the best sensitivity.

The output from the timing circuit 9 is a D.C. voltage signal and this, passed via the frequency meter 10 is fed to the rate meter 11. This latter comprises a differentiating circuit with a high gain resistance feedback D.C. amplifier supplied via a capacitor in the input circuit and produces an output voltage, displayed on the meter 11, which is proportional to the rate of change of the input voltage.

In operation of the system the substrate is placed in the coating chamber 1 and, if necessary, masked to leave exposed only those portions which are to be coated. When the chamber has been evacuated the heater is switched on and vapour is deposited both on the unmasked portions of the substrate and on the monitoring crystal 2. As the mass deposited per unit area on the monitoring crystal 2 increases so its natural resonance frequency decreases. Thus the frequency of the output signal from the first mixer 5 increases in proportion to the thickness of the film deposited and the frequency of the output from the second mixer is likewise also in direct proportion to the deposited film thickness although the frequency of this latter output is reduced to within the range 0–50 kc./s. The pulse shaping circuit 8 and the circuit 9 then turn the second mixer 7 output signal into:

(1) a reading on the frequency meter, the deflection of which thus becomes a direct indication of the thickness of the deposited film; and (2) a direct indication on the rate meter 11 of the rate at which deposition is taking place.

Once the required film thickness has been deposited it is arranged that an electromagnetically operated shutter is closed automatically to interrupt the flow of vapour from the evaporator to the substrate and a second substrate is moved to the deposition position in the coating chamber 1. The monitor crystal 2 will now have a film deposited on it and before commencing a second deposition run the variable oscillator 6 is adjusted so that the frequency of the output signal from the second mixer will still be in the range 0–50 kc./s. during the ensuing operation. After each subsequent operation, therefore, the variable oscillator 6 is adjusted to maintain that the signals derived from the second mixer are acceptable by the detecting units 8, 9, 10 and 11. The reference oscillator 4 is left untouched and the chamber 1 need not be dismounted nor need the monitor crystal be cleaned off.

The controlling of the rate of film formation is illustrated in FIGURE 2.

A D.C. voltage output is derived from the rate meter 11 and fed to a comparator 12 which compares the rate meter output voltage with a reference voltage and produces an error signal output which is fed into a D.C. amplifier 13. The amplified error signal is then fed from the amplifier 13 to a source current stabiliser 15 which maintains a source current at a constant level selected by the error signal amplifier 13 and causes the rate loop to be unaffected by changes in source resistance and mains voltages to the source transformer. The signal monitoring the source current is obtained from a current transformer 18 the secondary winding of which feeds directly into a non-inductive resistance heater load 20. The voltage developed across it and which is proportional to the source current is fed into the subsidiary current feedback loop of the source current stabiliser 15. The signal from the stabiliser 15 is then fed to a phase shift circuit 16 which is locked to the 50 c./s. supply and the phase angle is controlled by the signal derived from the amplifier 13 to regulate the point in each half cycle of the 50 c./s. supply at which outputs will appear from the phase shift circuit 16. The larger the signal applied the later in each half cycle before an output appears. The outputs from the phase shift circuit 16 are fed as trigger step bias signals alternately to each of a pair of silicon-controlled rectifiers represented by block 17 and which are connected in series with the heating circuit of the coating chamber 1 so that the power supplied from a transformer 19 to heater 20 is controlled by the triggering signals.

In this way an increase of the rate of growth in film thickness will cause an increase in the amplitude of the amplified error signal from the amplifier 13. This in turn causes an increase in the phase shift circuit 16 to trigger the silicon-controlled rectifiers to conduct for a smaller proportion of each cycle of the power supply and so decrease the rate at which heat is applied to the evaporator, and thus reduce the rate of growth of the film being deposited on the substrate. If an initial reduction of the rate of the growth of the film occurs the system works in a complementary way to supply more heat to the heater.

Prior to the process of evaporation it is sometimes desirable to degas material for various lengths of time and also bring material to within evaporating temperature in order to minimise delays between the opening of the electomagnetic shutter 1 and attaining the selected rate level. It is also occasionally necessary to raise the temperature of the source slowly during the degas time cycle. Accordingly there is provided a degas timer 14 which automatically selects the source current stabiliser 15 and will time the degas cycle from the initial slow rise for a period which may be preselected. The final degas current level is selected by arranging that a given signal be maintained constant within the source current stabiliser 15, after which degas period the timer automatically selects the error amplifier in the rate loop.

Although the invention has been described with reference to specific oscillator frequencies the invention is not limited thereto. For example, the chamber oscillator 2 may have an initial frequency in the range 1 mc./s.–20 mc./s. and the fixed frequency reference oscillator 4 may have a frequency of up to 20% greater than the initial frequency of the chamber oscillator. Whilst a specific AT-cut crystal has been described other types of crystals may be used. Similarly, the variable frequency referencing oscillator may be of any conventional type other than an emitter-coupled inductance capacitor tuned oscillator. The rate control apparatus may be designed to incorporate any silicon-controlled rectifier configuration.

We claim:

1. Vacuum coating monitoring apparatus including a first oscillator controllable by a quartz crystal disposed within a vacuum coating chamber, a second fixed frequency oscillator, a first mixer for deriving a first intermediate frequency signal from the first and second oscillators, a continuously variable frequency oscillator and a second mixer for deriving from the continuously variable oscillator and the output of the first mixer a second intermediate frequency signal whose frequency may be reduced to zero and means for producing a control signal proportional to the frequency of the second intermediate frequency signal, the control signal being utilised to control the thickness of the deposited coating.

2. Apparatus according to claim 1 in which the control signal is a direct current and is indicated by a meter, the apparatus also including a rate control circuit for producing and displaying on a rate meter a direct current rate control signal whose amplitude is proportional to the rate of change of the control signal.

3. Apparatus according to claim 1 in which the second fixed frequency oscillator is a quartz crystal controlled oscillator having a fixed frequency greater than the initial frequency of the first oscillator, the first mixer is a conventional diode mixer, the variable frequency oscillator is a conventional emitter-coupled inductance capacitor tuned oscillator with a low output impedance and the second mixer is a conventional diode mixer.

4. Apparatus according to claim 1 in which said first oscillator always oscillates at a frequency lower than that of said second fixed frequency oscillator.

5. Apparatus according to claim 1 further including a potentiometer voltage sensor having a sensitive switch type null detector to which said control signal is applied and an electromagnetically operated shutter located and adapted to terminate deposition when a preselected thickness of material has been deposited.

6. Apparatus according to claim 2 including reference signal producing means, comparator means for comparing said rate control signal with said reference signal and providing an error signal, a phase shift circuit and a silicon-controlled rectifier switching circuit adapted to regulate a power supply to a heater which supplies heat to the material to be deposited in dependence upon said error signal.

7. Apparatus according to claim 2 in which the means for producing the control signal comprise a square wave converter and a pulse delay timing circuit and the rate control circuit is a differentiating circuit including a high gain resistance feedback D.C. amplifier supplied via a capacitor in its input.

8. Apparatus according to claim 3 in which the first diode mixer includes a selectively tuned amplifier and the second diode mixer includes a low pass filter amplifier.

References Cited

UNITED STATES PATENTS

| | | | |
|---|---|---|---|
| 2,906,235 | 9/1935 | Hirsh | 118—9 X |
| 3,077,858 | 2/1963 | Ulug | 118—7 |
| 3,227,952 | 1/1966 | Proebster et al. | 116—9 |

RALPH S. KENDALL, *Primary Examiner.*

ALFRED L. LEAVITT, *Examiner.*

A. GOLIAN, *Assistant Examiner.*